(12) United States Patent
Ishitake et al.

(10) Patent No.: US 12,435,194 B2
(45) Date of Patent: Oct. 7, 2025

(54) FIBER-REINFORCED THERMOPLASTIC RESIN SUBSTRATE

(71) Applicant: Toray Industries, Inc, Tokyo (JP)

(72) Inventors: Kenji Ishitake, Nagoya (JP); Masayuki Koshi, Nagoya (JP); Koki Yoshino, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 573 days.

(21) Appl. No.: 17/910,541

(22) PCT Filed: Mar. 16, 2021

(86) PCT No.: PCT/JP2021/010526
§ 371 (c)(1),
(2) Date: Sep. 9, 2022

(87) PCT Pub. No.: WO2021/187459
PCT Pub. Date: Sep. 23, 2021

(65) Prior Publication Data
US 2023/0128101 A1    Apr. 27, 2023

(30) Foreign Application Priority Data
Mar. 18, 2020  (JP) .............................. 2020-047770

(51) Int. Cl.
*C08J 5/24*  (2006.01)

(52) U.S. Cl.
CPC ........... *C08J 5/243* (2021.05); *C08J 2381/02* (2013.01)

(58) Field of Classification Search
CPC ............................. C08J 5/243; C08J 2381/02
See application file for complete search history.

(56) References Cited

U.S. PATENT DOCUMENTS

| 2014/0107273 A1* | 4/2014 | Ochiai ................. C08L 77/02 |
|---|---|---|
| | | 525/166 |
| 2016/0251498 A1 | 9/2016 | Imai et al. |
| 2019/0040256 A1* | 2/2019 | Isago ...................... C08J 3/20 |

FOREIGN PATENT DOCUMENTS

| EP | 0 361 364 A2 | 4/1990 |
|---|---|---|
| EP | 0 435 243 A2 | 7/1991 |
| JP | S60-49213 B2 | 10/1985 |
| JP | H02-180934 A | 7/1990 |
| JP | H03-292335 A | 12/1991 |
| JP | H09-25346 A | 1/1997 |
| JP | 2012-167270 A | 9/2012 |
| JP | 2016169276 A * | 9/2016 |
| JP | 2016-188289 A | 11/2016 |
| JP | 2017-82159 A | 5/2017 |
| JP | 2020-26455 A | 2/2020 |
| WO | 2015/064482 A1 | 5/2015 |

OTHER PUBLICATIONS

International Search Report dated May 18, 2021 in counterpart International Application No. PCT/JP2021/010526.
Written Opinion dated May 18, 2021 in counterpart International Application No. PCT/JP2021/010526.
Extended European Search Report dated Mar. 26, 2024, from counterpart European Application No. 21 77 1788.3.

* cited by examiner

*Primary Examiner* — Robert S Jones, Jr.
*Assistant Examiner* — Elizabeth Amato
(74) *Attorney, Agent, or Firm* — DLA Piper LLP (US)

(57) ABSTRACT

A fiber-reinforced thermoplastic resin substrate has good mechanical properties. The fiber-reinforced thermoplastic resin substrate includes a plurality of continuous reinforcing fibers and a polyphenylene sulfide resin with which the plurality of continuous reinforcing fibers are impregnated, wherein the polyphenylene sulfide resin has a weight average molecular weight of 75,000 or more and 150,000 or less, and the polyphenylene sulfide resin has an ash content of 0.001 wt % or more and 0.30 wt % or less.

4 Claims, No Drawings

FIBER-REINFORCED THERMOPLASTIC RESIN SUBSTRATE

TECHNICAL FIELD

This disclosure relates to a fiber-reinforced thermoplastic resin substrate.

BACKGROUND

Fiber-reinforced thermoplastic resin substrates in which a plurality of continuous reinforcing fibers are impregnated with thermoplastic resin not only have good lightweight effect, but also have good toughness, welding processability, and recyclability as compared with fiber-reinforced thermoplastic resin substrates using thermosetting resin. The fiber-reinforced thermoplastic resin substrates are thus widely used in various applications, for example, transportation equipment such as aircrafts and automobiles, and sports, electric, and electronic parts. In recent years, high added values such as high heat resistance, low water absorption, high toughness, and molding processability have been required in addition to mechanical strength and weight reduction, which have been conventionally added values of carbon-fiber-reinforced thermoplastic (CFRTP) intermediate substrates, and technological development of high-functional CFRTP intermediate substrates has been strongly required mainly for aircraft and automobile applications.

Polyphenylene sulfide (sometimes PPS) resin is a crystalline thermoplastic resin having good heat resistance and chemical resistance, and is also attracting attention as a matrix resin of a composite material. However, conventional PPS resins are inherently brittle materials having low toughness, and where fibers that are hardly expanded by heating such as carbon fibers, are used, the residual stress during molding is large, and slight disturbance of the arrangement of the fibers causes a molded article to curve or have cracks, and composite physical properties such as flexural strength and interlayer shear strength are often insufficient.

Japanese Patent No. 1477262 discloses a method of producing a carbon-fiber-reinforced PPS substrate having good mechanical properties by impregnating fibers with uncrosslinked PPS resin, heating the PPS resin at 300 to 360° C. for a specific time, and subjecting the PPS resin to a thermal crosslinking treatment.

Japanese Patent Laid-open Publication No. 2-180934 discloses a method of producing a carbon-fiber-reinforced PPS substrate having good mechanical properties by using a PPS resin oxidatively crosslinked in the atmosphere.

Further, Japanese Patent Laid-open Publication No. 3-292335 discloses a method of producing a carbon-fiber-reinforced PPS substrate having good mechanical properties by using a resin composition of a PPS resin oxidatively crosslinked in the atmosphere and a high molecular weight PPS resin.

Furthermore, Japanese Patent Laid-open Publication No. 9-25346 discloses a method of producing a short-carbon-fiber-reinforced PPS substrate having good mechanical characteristics by using a resin composition of a high molecular weight PPS resin.

In the method proposed in JP '262, a carbon-fiber-reinforced PPS substrate having good mechanical properties is obtained, but a carbon-fiber-reinforced PPS substrate having improved mechanical properties is desired. The method, in which the PPS resin is heated to a high temperature during production, has a problem that a gelled product is likely to be generated in the PPS resin and the stability of the process deteriorates. In addition, the molecular weight, carboxyl group content, and ash content of the PPS resin are not specifically disclosed.

The method proposed in JP '934 has a problem that a gelled product is likely to be generated in the PPS resin and the stability of the process at the time of production and the mechanical characteristics of the molded article deteriorate. In addition, the molecular weight, carboxyl group content, and ash content of the PPS resin are not specifically disclosed.

The method proposed in JP '335 has a problem that the production process is complicated, a gelled product is likely to be generated in the PPS resin, and the stability of the process at the time of production and the mechanical properties of the molded article deteriorate.

In the method proposed in JP '346, a short-carbon-fiber-reinforced PPS substrate having good mechanical properties is obtained, but a carbon-fiber-reinforced PPS substrate having improved mechanical properties is desired. In addition, the molecular weight, carboxyl group content, and ash content of the PPS resin are not specifically disclosed.

The mechanical properties of the fiber-reinforced PPS substrates with the conventional technique are not sufficient as described above. It could therefore be helpful to provide a fiber-reinforced thermoplastic resin substrate having good mechanical properties.

SUMMARY

We thus provide:

(1) A fiber-reinforced thermoplastic resin substrate including a plurality of continuous reinforcing fibers and a polyphenylene sulfide resin with which the plurality of continuous reinforcing fibers are impregnated, wherein the polyphenylene sulfide resin has a weight average molecular weight of 75,000 or more and 150,000 or less, and the polyphenylene sulfide resin has an ash content of 0.001 wt % or more and 0.30 wt % or less.

(2) The fiber-reinforced thermoplastic resin substrate according to (1), wherein the ash content of the polyphenylene sulfide resin is 0.001 wt % or more and 0.25 wt % or less.

(3) The fiber-reinforced thermoplastic resin substrate according to (1) or (2), wherein the polyphenylene sulfide resin has a carboxyl group content of 5 µmol/g or more and 25 µmol/g or less.

(4) The fiber-reinforced thermoplastic resin substrate according to any one of (1) to (3), having a fiber volume content of 20 to 65 vol %.

(5) The fiber-reinforced thermoplastic resin substrate according to any one of (1) to (4), wherein a molded piece of the fiber-reinforced thermoplastic resin substrate has a 900 flexural strength of 130 to 200 MPa as measured in a 90° flexural test in accordance with ASTM D790.

We thus obtain a fiber-reinforced thermoplastic resin substrate having good mechanical properties.

DETAILED DESCRIPTION

Hereinafter, examples of substrates will be described in detail.

Reinforcing Fiber

The type of the reinforcing fibers is not particularly limited, and examples thereof include carbon fibers, metal fibers, organic fibers, and inorganic fibers. Two or more of these fibers may be used in combination. Using carbon fibers for the reinforcing fibers enables a fiber-reinforced thermoplastic resin substrate having high mechanical properties while being lightweight to be obtained.

Examples of the carbon fibers include PAN-based carbon fibers made from poly-acrylonitrile (PAN) fibers as a raw material, pitch-based carbon fibers made from petroleum tar and petroleum pitch as raw materials, cellulose-based carbon fibers made from viscose rayon and cellulose acetate as raw materials, vapor-grown carbon fibers made from hydrocarbons as raw materials, and graphitized fibers of these. Among these carbon fibers, PAN-based carbon fibers are preferably used because they have good balance between the strength and elastic modulus.

Examples of the metal fibers include fibers made from metals such as iron, gold, silver, copper, aluminum, brass, and stainless steel.

Examples of the organic fibers include fibers made from organic materials such as aramid, polybenzoxazole (PBO), polyphenylene sulfide, a polyester, a polyamide, and polyethylene. Examples of the aramid fibers include para-aramid fibers having good strength and elastic modulus, and meta-aramid fibers having good flame retardancy and long-term heat resistance. Examples of the para-aramid fibers include polyparaphenylene terephthalamide fibers and copolyparaphenylene-3,4'-oxydiphenylene terephthalamide fibers, and examples of the meta-aramid fibers include polymetaphenylene isophthalamide fibers. The aramid fibers preferably used are para-aramid fibers having a higher elastic modulus than that of the meta-aramid fibers.

Examples of the inorganic fibers include fibers made from inorganic materials such as glass, basalt, silicon carbide, and silicon nitride. Examples of the glass fibers include E glass fibers (for electric purposes), C glass fibers (for anticorrosion purposes), S glass fibers, and T glass fibers (of high strength and high elastic modulus). The basalt fibers are a fiberized material of mineral basalt, and are fibers excellent in heat resistance. Basalt generally contains 9 to 25 wt % of FeO or $FeO_2$ that is a compound of iron and 1 to 6 wt % of TiO or $TiO_2$ that is a compound of titanium, and can be fiberized in a molten state with the amounts of these components being increased.

Since the fiber-reinforced thermoplastic resin substrate is often expected to serve as a reinforcing material, it is desirable to exhibit high mechanical properties, and it is preferable that the reinforcing fibers contain carbon fibers to exhibit high mechanical properties.

The reinforcing fibers are usually formed by arranging one or a plurality of reinforcing fiber bundles each obtained by bundling a large number of monofilaments. The total number of filaments (number of monofilaments) of the reinforcing fibers when one or a plurality of reinforcing fiber bundles are arranged is preferably 1,000 to 2,000,000. From the viewpoint of productivity, the total number of filaments of the reinforcing fibers is more preferably 1,000 to 1,000,000, still more preferably 1,000 to 600,000, and particularly preferably 1,000 to 300,000. The reinforcing fibers are likely to improve productivity by having the total number of filaments of 1,000 or more. The reinforcing fibers are likely to improve dispersibility and handleability by having the total number of filaments of 2,00,000 or less.

One reinforcing fiber bundle is preferably formed by bundling 1,000 to 50,000 monofilaments of reinforcing fiber having an average diameter of 5 to 10 μm.

The thermoplastic resin with which a plurality of continuous reinforcing fibers are impregnated is a polyphenylene sulfide resin to be described later.

The continuous reinforcing fibers refer to reinforcing fibers without discontinuities. Examples of the form and arrangement of the reinforcing fibers include those arranged in one direction, woven fabrics (cloths), knitted fabrics, braids, and tows. Among them, it is preferable that the reinforcing fibers be arranged in one direction because mechanical properties in a specific direction can improve efficiently.

Polyphenylene Sulfide Resin

The polyphenylene sulfide resin (PPS resin) is a polymer having a repeating unit represented by the structural formula:

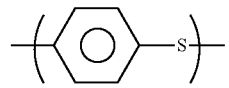

From the viewpoint of heat resistance, the PPS resin preferably contains the repeating unit represented by the structural formula in 70 mol % or more, more preferably 90 mol % or more. About less than 30 mol % of the repeating unit of the PPS resin may be composed of a repeating unit having the structure or the like:

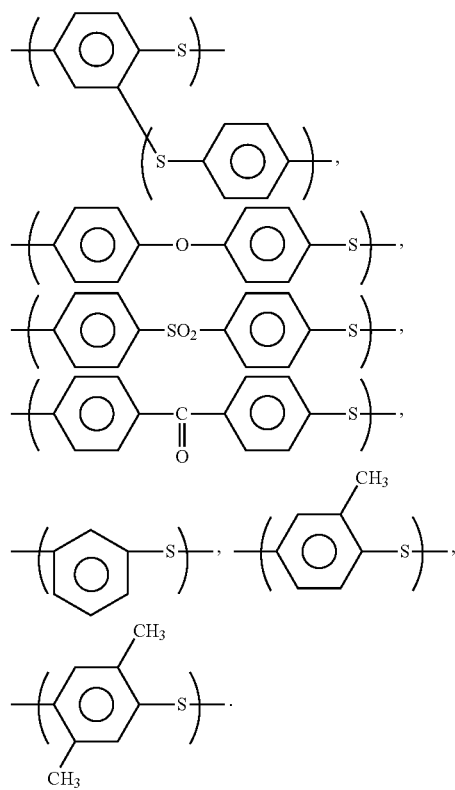

The PPS resin partially having such a structure has a low melting point, which is advantageous in terms of moldability.

It is important that the weight average molecular weight of the PPS resin is 75,000 or more and 150,000 or less. The lower limit of the weight average molecular weight of the PPS resin is 75,000, preferably 76,000, and more preferably 77,000. The upper limit of the weight average molecular weight of the PPS resin is 150,000, preferably 130,000, and more preferably 100,000. When the weight average molecular weight of the PPS resin is in the above preferable range, a fiber-reinforced thermoplastic resin substrate having improved mechanical properties tends to be obtained. When the weight average molecular weight is less than 75,000, the mechanical properties of the PPS resin itself tend to decrease, and further, the adhesion between the PPS resin and the reinforcing fibers tends to decrease, and therefore the mechanical properties of the fiber-reinforced thermoplastic resin substrate tend to decrease. On the other hand, when the weight average molecular weight of the PPS resin is more than 150,000, the melt viscosity significantly increases, and therefore the impregnation property with the reinforcing fibers deteriorates, and a fiber-reinforced thermoplastic resin substrate in which the reinforcing fibers are well impregnated with the PPS resin tends not to be obtained.

The weight average molecular weight is determined by gel permeation chroma-togramphy (GPC) manufactured by Senshu Scientific Co., Ltd., polystyrene equivalent, as described later.

It is important that the ash content of the PPS resin is 0.001 wt % or more and 0.30 wt % or less. The upper limit of the ash content is 0.30 wt %, preferably 0.25 wt %, more preferably 0.20 wt % or less, and still more preferably 0.10 wt %. When the ash content of the PPS resin is in the above preferable range, a fiber-reinforced thermoplastic resin substrate having improved mechanical properties tends to be obtained. When the ash content of the PPS resin is less than 0.001 wt %, the toughness of the PPS resin itself and the adhesion to reinforcing fibers tend to decrease. On the other hand, when the ash content of the PPS resin is more than 0.30 wt %, the mechanical properties of the resulting fiber-reinforced thermoplastic resin substrate deteriorates, which is not preferable. Examples of the means for setting the ash content within the above range include a method of performing an acid treatment and a hot water treatment in a post-treatment step of the method of producing a PPS resin to be described later. The ash content of the PPS resin is measured by the method described later.

The carboxyl group content of the PPS resin is preferably 5 μmol/g or more and 25 mol/g or less from the viewpoint of improving adhesion to reinforcing fibers. The lower limit of the carboxyl group content is preferably 5 μmol/g, more preferably 8 μmol/g, and still more preferably 10 μmol/g. The upper limit of the carboxyl group content is preferably 25 μmol/g and more preferably 20 μmol/g. When the carboxyl group content of the PPS resin is 5 μmol/g or more, interaction with reinforcing fibers and adhesion to reinforcing fibers tend to further improve. On the other hand, when the carboxyl group content of the PPS resin is 25 μmol/g or less, the volatile content in the processing step can further decrease. The carboxyl group content of the PPS resin is determined by Fourier transform infrared spectrometer (FT-IR).

Examples of the method of introducing a carboxyl group into the PPS resin include a method in which a polyhalogenated aromatic compound containing a carboxyl group is copolymerized, and a method in which a compound containing a carboxyl group and/or a carboxylic anhydride group, for example, maleic anhydride or sorbic acid, is added and reacted with the PPS resin while being melt-kneaded.

The temperature lowering crystallization temperature of the PPS resin is preferably 190° C. or more and 215° C. or less. The lower limit of the temperature lowering crystallization temperature of the PPS resin is preferably 190° C. and more preferably 200° C. The upper limit of the temperature lowering crystallization temperature of the PPS resin is preferably 215° C. and more preferably 210° C. When the temperature lowering crystallization temperature of the PPS resin is in the above range, a fiber-reinforced thermoplastic resin substrate having improved mechanical properties and heat weldability tends to be obtained. Unless otherwise specified, the temperature lowering crystallization temperature is a value obtained by measuring thermal characteristics of the obtained polymer in a nitrogen atmosphere using a differential scanning calorimeter (Q200 manufactured by TA Instruments) as described later. Examples of the means for setting the temperature lowering crystallization temperature within the above range include a method of performing an acid treatment and a hot water treatment in a post-treatment step of the method of producing a PPS resin to be described later.

Hereinafter, an example of a method of producing a PPS resin will be described, but the method is not limited to the following method as long as a PPS resin having the above structure can be obtained.

First, the contents of the polyhalogen aromatic compound, the sulfidizing agent, the polymerization solvent, the molecular weight modifier, the polymerization aid and the polymerization stabilizer used in the method of producing a PPS resin will be described.

Polyhalogenated Aromatic Compound

The polyhalogenated aromatic compound refers to a compound having two or more halogen atoms in one molecule. Specific examples include polyhalogenated aromatic compounds such as p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene. Among them, p-dichlorobenzene is preferable. In addition, for the purpose of introducing a carboxyl group, it is one of preferable aspects to use a carboxyl group-containing dihalogenated aromatic compound such as 2,4-dichlorobenzoic acid, 2,5-dichlorobenzoic acid, 2,6-dichlorobenzoic acid, 3,5-dichlorobenzoic acid, or a mixture thereof as a copolymerization monomer, and it is also possible to combine two or more different polyhalogenated aromatic compounds to form a copolymer. As such a copolymer, a copolymer containing a p-dihalogenated aromatic compound as a main component is preferable.

The amount of the polyhalogenated aromatic compound is preferably 0.9 to 2.0 mol, more preferably 0.95 to 1.5 mol, and still more preferably 1.005 to 1.2 mol per 1 mol of the sulfidizing agent, from the viewpoint of obtaining a PPS resin having a viscosity suitable for processing.

Sulfidizing Agent

Examples of the sulfidizing agent include alkali metal sulfides, alkali metal hydrosulfides, and hydrogen sulfide.

Specific examples of the alkali metal sulfide include lithium sulfide, sodium sulfide, potassium sulfide, rubidium sulfide, cesium sulfide, and a mixture of two or more thereof. Among them, sodium sulfide is preferably used. These alkali metal sulfides may be used as hydrates or aqueous mixtures, or in the form of anhydrides.

Specific examples of the alkali metal hydrosulfide include, sodium hydrosulfide, potassium hydrosulfide, lithium hydrosulfide, rubidium hydrosulfide, cesium hydrosulfide, and a mixture of two or more thereof. Among them, sodium hydrosulfide is preferably used. These alkali metal hydrosulfides may be used as hydrates or aqueous mixtures, or in the form of anhydrides.

In addition, an alkali metal sulfide prepared in situ in the reaction system from an alkali metal hydrosulfide and an alkali metal hydroxide may also be used. In addition, it is possible to prepare an alkali metal sulfide from an alkali metal hydrosulfide and an alkali metal hydroxide and transfer the alkali metal sulfide to a polymerization tank for use.

Alternatively, an alkali metal sulfide prepared in situ in the reaction system from an alkali metal hydroxide such as lithium hydroxide or sodium hydroxide and hydrogen sulfide may also be used. In addition, it is possible to prepare an alkali metal sulfide from an alkali metal hydroxide such as lithium hydroxide or sodium hydroxide and hydrogen sulfide and transfer the alkali metal sulfide to a polymerization tank for use.

The amount of charged sulfidizing agent refers to a remaining amount obtained by subtracting a loss from an actual charged amount when a partial loss of the sulfidizing agent occurs before the start of the polymerization reaction due to a dehydration operation or the like.

It is also possible to use an alkali metal hydroxide and/or an alkaline earth metal hydroxide in combination with the sulfidizing agent. Specific examples of the alkali metal hydroxide include sodium hydroxide, potassium hydroxide, lithium hydroxide, rubidium hydroxide, cesium hydroxide, and a mixture of two or more thereof as preferable examples, and specific examples of the alkaline earth metal hydroxide include calcium hydroxide, strontium hydroxide, and barium hydroxide. Among them, sodium hydroxide is preferably used.

When an alkali metal hydrosulfide is used as the sulfidizing agent, it is particularly preferable to simultaneously use an alkali metal hydroxide. The amount of the alkali metal hydroxide is preferably 0.95 to 1.20 mol, more preferably 1.00 to 1.15 mol, and still more preferably 1.005 to 1.100 mol per 1 mol of the alkali metal hydrosulfide.

Polymerization Solvent

As the polymerization solvent, an organic polar solvent is preferably used. Specific examples thereof include N-alkylpyrrolidones such as N-methyl-2-pyrrolidone and N-ethyl-2-pyrrolidone, caprolactams such as N-methyl-F-caprolactam, aprotic organic solvents represented by 1,3-dimethyl-2-imidazolidinone, N,N-dimethylacetamide, N,N-dimethylformamide, hexamethylphosphoric acid triamide, dimethyl sulfone, tetramethylene sulfoxide, and the like, and mixtures thereof, and any of these is preferably used because of high stability of the reaction. Among them, N-methyl-2-pyrrolidone (hereinafter, it may be abbreviated as NMP) is particularly preferably used.

The amount of the organic polar solvent is preferably 2.0 mol to 10 mol, more preferably 2.25 mol to 6.0 mol, and still more preferably 2.5 mol to 5.5 mol per 1 mol of the sulfidizing agent.

Molecular Weight Modifier

A monohalogen compound (not necessarily an aromatic compound) may be used in combination with the above-described polyhalogenated aromatic compound to form a terminal of the PPS resin to be produced or to adjust a polymerization reaction or a molecular weight. That is, a monohalogen compound may be used as the molecular weight modifier.

Polymerization Aid

It is also one of preferable aspects to use a polymerization aid to obtain a PPS resin having a relatively high polymerization degree in a shorter time. The polymerization aid means a substance having an action of increasing the viscosity of the resulting PPS resin. Specific examples of such a polymerization aid include an organic carboxylate, water, an alkali metal chloride, an organic sulfonate, an alkali metal sulfate, an alkaline earth metal oxide, an alkali metal phosphate, and an alkaline earth metal phosphate. These substances may be used alone, or two or more thereof may be used simultaneously. Among them, an organic carboxylate, water, and an alkali metal chloride are preferable. As the organic carboxylate, an alkali metal carboxylate is preferable. As the alkali metal chloride, lithium chloride is preferable.

The alkali metal carboxylate refers to a compound represented by R(COOM)n, wherein R is an alkyl group having 1 to 20 carbon atoms, a cycloalkyl group, an aryl group, an alkylaryl group, or an arylalkyl group, M is an alkali metal selected from lithium, sodium, potassium, rubidium, and cesium, and n is an integer of 1 to 3. The alkali metal carboxylate may also be used as a hydrate, an anhydride, or an aqueous solution. Specific examples of the alkali metal carboxylate include lithium acetate, sodium acetate, potassium acetate, sodium propionate, lithium valerate, sodium benzoate, sodium phenylacetate, potassium p-toluylate, and mixtures thereof.

The alkali metal carboxylate may be formed by adding an organic acid and one or more compounds selected from the group consisting of an alkali metal hydroxide, an alkali metal carbonate, and an alkali metal bicarbonate at almost equal chemical equivalents and reacting them. Among the alkali metal carboxylates, a lithium salt is preferable because, though it is expensive, it has high solubility in the reaction system and a large effect as an aid. Potassium, rubidium, and cesium salts may have slightly low solubility in the reaction system but are preferable because they are inexpensive. Sodium acetate is most preferable from the viewpoint of appropriate solubility in the polymerization system, aid effect, and balance of price.

When these alkali metal carboxylates are used as a polymerization aid, the amount thereof is usually preferably 0.01 mol to 2 mol, and from the viewpoint of obtaining a higher degree of polymerization, the amount is more preferably 0.1 to 0.6 mol, and still more preferably 0.2 to 0.5 mol per 1 mol of the charged alkali metal sulfide.

When water is used as a polymerization aid, the amount of water is usually preferably 0.3 mol to 15 mol, more preferably 0.6 to 10 mol, and still more preferably 1 to 5 mol per 1 mol of the charged alkali metal sulfide, from the viewpoint of obtaining a higher degree of polymerization.

It is possible to use two or more of these polymerization aids in combination. For example, when an alkali metal carboxylate and water are used in combination, a higher molecular weight can be obtained with a smaller amount of each.

The timing of addition of these polymerization aids is not particularly specified, and these polymerization aids may be added at any time point of the pre-process, start of the polymerization, or during the polymerization to be described later, or may be added in multiple portions. When an alkali metal carboxylate is used as the polymerization aid, it is more preferable to add the alkali metal carboxylate simultaneously at the start of the pre-process or at the start of polymerization from the viewpoint of easy addition. When water is used as the polymerization aid, it is effective to add water during the polymerization reaction after charging the polyhalogenated aromatic compound.

Polymerization Stabilizer

A polymerization stabilizer may also be used to stabilize the polymerization reaction system and prevent side reactions. The polymerization stabilizer contributes to stabilization of the polymerization reaction system and inhibits undesirable side reactions. A sign of the side reaction is the production of thiophenol, and the addition of a polymerization stabilizer can inhibit the production of thiophenol.

Specific examples of the polymerization stabilizer include compounds such as alkali metal hydroxides, alkali metal carbonates, alkaline earth metal hydroxides, and alkaline earth metal carbonates. Among them, alkali metal hydroxides such as sodium hydroxide, potassium hydroxide, and lithium hydroxide are preferable. Since the above-described alkali metal carboxylate also acts as a polymerization stabilizer, it is included in one of the polymerization stabilizers. It has been described above that when an alkali metal hydrosulfide is used as the sulfidizing agent, it is particularly preferable to simultaneously use an alkali metal hydroxide, but here, an excess amount of alkali metal hydroxide with respect to the sulfidizing agent can also serve as a polymerization stabilizer.

These polymerization stabilizers may be used singly or in combination of two or more kinds thereof. The amount of the polymerization stabilizer is usually preferably 0.02 to 0.2 mol, more preferably 0.03 to 0.1 mol, and still more preferably 0.04 to 0.09 mol per 1 mol of the charged alkali metal sulfide. When the amount is 0.02 mol or more, a sufficient stabilization effect is likely to be obtained. When the amount is 0.2 mol or less, it tends to be economically advantageous, or the polymer yield tends to improve.

The timing of addition of the polymerization stabilizer is not particularly specified, and the polymerization stabilizer may be added at any time point of the pre-process, start of the polymerization, or during the polymerization to be described later, or may be added in multiple portions, but it is more preferable to add the polymerization stabilizer simultaneously at the start of the pre-process or at the start of the polymerization because of easy addition.

Next, a preferable method of producing the PPS resin will be specifically described in order of a pre-process, a polymerization reaction step, a recovery step, and a post-treatment step, but of course, the method is not limited to this method.

Pre-Process

In the method of producing the PPS resin, the sulfidizing agent is usually used in the form of a hydrate, but it is preferable to raise the temperature of a mixture containing an organic polar solvent and the sulfidizing agent before adding the polyhalogenated aromatic compound and to remove an excessive amount of water to the outside of the system.

As described above, as the sulfidizing agent, a sulfidizing agent prepared from an alkali metal hydrosulfide and an alkali metal hydroxide in situ in the reaction system or in a tank different from the polymerization tank may also be used. This method is not particularly limited, but examples thereof include a method in which an alkali metal hydrosulfide and an alkali metal hydroxide are added to an organic polar solvent in an inert gas atmosphere in a temperature range of normal temperature to 150° C., preferably normal temperature to 100° C., and the temperature is raised to at least 150° C. or higher, preferably 180 to 260° C., under normal pressure or reduced pressure to distill off moisture. The polymerization aid may be added at this stage. In addition, toluene or the like may be added to perform the reaction to promote the distillation off of moisture.

In the polymerization reaction, the amount of water in the polymerization system is preferably 0.3 to 10.0 mol per 1 mol of the charged sulfidizing agent. The amount of water in the polymerization system is an amount obtained by subtracting the amount of water removed to the outside of the polymerization system from the amount of water charged to the polymerization system. The water to be charged may be in any form of water, an aqueous solution, crystal water, or the like.

Polymerization Reaction Step

A PPS resin is produced by reacting the sulfidizing agent with the polyhalogenated aromatic compound in an organic polar solvent at a temperature of 200° C. or more and less than 290° C.

In starting the polymerization reaction step, the organic polar solvent, the sulfidizing agent, and the polyhalogenated aromatic compound are desirably mixed in an inert gas atmosphere in a temperature range of normal temperature to 240° C., preferably 100 to 230° C. The polymerization aid may be added at this stage. The order of charging these raw materials may be in any order and may be simultaneous.

The mixture is usually heated to a temperature of 200° C. to 290° C. The rate of temperature increase is not particularly limited, but a rate of 0.01 to 5° C./min is usually selected, and 0.1 to 3° C./min is more preferable.

In general, the temperature is finally raised to 250 to 290° C., and the reaction is carried out at that temperature for usually 0.25 to 50 hours, preferably 0.5 to 20 hours.

A method in which a reaction is performed at, for example, 200° C. to 260° C. for a certain period of time before reaching the final temperature, and then the temperature is raised to 270 to 290° C. is effective in obtaining a higher degree of polymerization. At this time, as the reaction time at 200° C. to 260° C., usually a range of 0.25 hours to 20 hours is selected, and preferably a range of 0.25 to 10 hours is selected.

It may be effective to perform polymerization in a plurality of stages to obtain a polymer having a higher degree of polymerization. When the polymerization is performed in a plurality of stages, it is effective to perform it at a stage where the conversion rate of the polyhalogenated aromatic compound in the system at 245° C. has reached 40 mol % or more, preferably 60 mol %.

The conversion rate of the polyhalogenated aromatic compound (PHA) is a value calculated by the following formulas (a) and (b). The PHA residual amount can be usually determined by gas chromatography.

(A) when the Polyhalogenated Aromatic Compound is Added in Excess in Molar Ratio with Respect to the Alkali Metal Sulfide Conversion rate=[charged amount of PHA (mol)−residual amount of PHA (mol)]/[charged amount of PHA (mol)−excess amount of PHA (mol)]  (a)

(B) Other than (A)

Conversion rate=[charged amount of PHA (mol)−residual amount of PHA (mol)]/[charged amount of PHA (mol)]  (b)

Recovery Step

In the method of producing the PPS resin, a solid is recovered from a polymerization reaction product containing a polymer, a solvent and the like after completion of polymerization. As the recovery method, any known method may be employed.

For example, a method of performing a slow cooling after completion of the polymerization reaction to recover a particulate polymer may be used. The slow cooling rate at this time is not particularly limited, but is usually about 0.1° C./min to 3° C./min. It is not necessary to perform slow cooling at the same rate in the entire process of the slow cooling step, and a method of performing a slow cooling at a rate of 0.1 to 1° C./min and then 1° C./min or more until the polymer particles are crystallized and precipitated may be employed.

It is also one of preferable methods to perform the above recovery under a rapid cooling condition, and examples of a preferable method of the recovery method include a flush method. The flush method is a method in which a polymerization reaction product is flushed from a high temperature and high pressure (usually 250° C. or more and 8 kg/cm² or more) state to an atmosphere of normal pressure or reduced pressure, and the polymer is recovered in a powdery form simultaneously with solvent recovery. The flush herein means that the polymerization reaction product is ejected from a nozzle. Specific examples of the atmosphere in which the polymerization reaction product is flushed include nitrogen or water vapor at normal pressure, and the temperature thereof is usually 150° C. to 250° C.

Post-Treatment Step

The PPS resin may be produced through the polymerization and recovery steps described above, and then subjected to an acid treatment, a hot water treatment, washing with an organic solvent, or an alkali metal or alkaline earth metal treatment.

The acid treatment is performed as follows. The acid used for the acid treatment of the PPS resin is not particularly limited as long as it does not have the action of decomposing the PPS resin, and examples thereof include acetic acid, hydrochloric acid, sulfuric acid, phosphoric acid, silicic acid, carbonic acid, and propyl acid. Among them, acetic acid and hydrochloric acid are more preferably used. Those that decompose and degrade the PPS resin such as nitric acid are not preferable.

Examples of the acid treatment method include a method of immersing the PPS resin in an acid or an aqueous solution of an acid. Stirring or heating may be appropriately performed as necessary. For example, when acetic acid is used, a sufficient effect can be obtained by immersing the PPS resin powder in an aqueous solution having a pH of 4 heated to 80 to 200° C. and stirring the mixture for 30 minutes. The pH after the treatment may be 4 or more, for example, about pH 4 to 8. The acid-treated PPS resin is preferably washed several times with water or warm water to remove residual acid or salt. The water to be used for washing is preferably distilled water or deionized water in the sense that the effect of the preferable chemical modification of the PPS resin by the acid treatment is not impaired.

The hot water treatment is performed as follows. When the PPS resin is subjected to the hot water treatment, the temperature of the hot water is preferably 100° C. or more, more preferably 120° C. or more, still more preferably 150° C. or more, and particularly preferably 170° C. or more. When the temperature is lower than 100° C., the effect of preferable chemical modification of the PPS resin is small, which is not preferable.

The water to be used is preferably distilled water or deionized water to exhibit a preferable effect of chemical modification of the PPS resin by the hot water treatment. The operation of the hot water treatment is not particularly limited and, for example, the hot water treatment may be performed by a method in which a predetermined amount of PPS resin is added to a predetermined amount of water and heated and stirred in a pressure vessel, a method in which the hot water treatment is continuously performed or the like. The ratio of the PPS resin to water is preferably large, and a bath ratio of 200 g or less of the PPS resin to 1 liter of water is usually selected.

In addition, the atmosphere of the treatment is desirably an inert atmosphere to avoid decomposition of the terminal group. Further, the PPS resin that has been subjected to the hot water treatment is preferably washed several times with warm water to remove residual components.

The washing with an organic solvent is performed as follows. The organic solvent to be used for washing the PPS resin is not particularly limited as long as it does not have an action of decomposing the PPS resin or the like, and examples thereof include nitrogen-containing polar solvents such as N-methyl-2-pyrrolidone, dimethylformamide, dimethylacetamide, 1,3-dimethyl-imidazolidinone, hexamethylphosphorasamide, and piperazinones, sulfoxide or sulfone based solvents such as dimethylsulfoxide, dimethylsulfone, and sulfolane, ketone-based solvents such as acetone, methyl ethyl ketone, diethyl ketone, and acetophenone, ether-based solvents such as dimethyl ether, dipropyl ether, dioxane, and tetrahydrofuran, halogen-based solvents such as chloroform, methylene chloride, trichloroethylene, dichloroethylene chloride, perchloroethylene, monochloroethane, dichloroethane, tetrachloroethane, perchloroethane, and chlorobenzene, alcohol or phenol based solvents such as methanol, ethanol, propanol, butanol, pentanol, ethylene glycol, propylene glycol, phenol, cresol, polyethylene glycol, polypropylene glycol, and aromatic hydrocarbon-based solvents such as benzene, toluene, and xylene. Among these organic solvents, N-methyl-2-pyrrolidone, acetone, dimethylformamide, and chloroform are particularly preferable. These organic solvents are used singly or in a mixture of two or more kinds thereof.

Examples of the method of washing with an organic solvent include a method of immersing the PPS resin in an organic solvent. Stirring or heating may be appropriately performed as necessary. The washing temperature when the PPS resin is washed with the organic solvent is not particularly limited and, for example, any temperature of about normal temperature to 300° C. may be selected. The higher the washing temperature, the higher the washing efficiency tends to be. However, a sufficient effect is usually obtained at a washing temperature of normal temperature to 150° C. It is also possible to perform the washing under pressure in a pressure vessel at a temperature equal to or higher than the boiling point of the organic solvent. The washing time is not particularly limited either. Depending on the washing conditions, a sufficient effect can be usually obtained by performing the washing for 5 minutes or more in batch washing. It is also possible to perform the washing continuously.

The alkali metal or alkaline earth metal treatment is performed as follows. Examples of the method of performing the alkali metal and alkaline earth metal treatment include a method of adding an alkali metal salt or an alkaline earth metal salt before, during, or after the pre-process, a method of adding an alkali metal salt or an alkaline earth metal salt into a polymerization pot before, during, or after the polymerization step, and a method of adding an alkali metal salt or an alkaline earth metal salt at the first, middle, or last stage of the washing step. Among them, the easiest method includes a method of removing residual oligomers and residual salts by washing the resin with an organic solvent or washing with warm water or hot water, and then adding an alkali metal salt or an alkaline earth metal salt. The alkali metal or the alkaline earth metal is preferably introduced into the PPS resin in the form of alkali metal ions or alkaline earth metal ions such as acetate, hydroxide, and carbonate. Excessive alkali metal salt and alkaline earth metal salt are preferably removed by warm water washing or the like. The concentration of alkali metal ions or alkaline earth metal ions at the time of introducing the alkali metal and alkaline earth metal is preferably 0.001 to 0.07 mmol, more preferably 0.01 to 0.05 mmol per 1 g of the PPS resin.

The temperature is preferably 50° C. or more, more preferably 75° C. or more, and particularly preferably 90° C. or more. There is no particular upper limit temperature, but it is usually preferably 280° C. from the viewpoint of operability. The bath ratio (the weight of the washing liquid to the weight of the dry PPS resin) is preferably 0.5 or more, more preferably 3 or more, still more preferably 5 or more.

It is also possible to make the PPS resin have a high molecular weight through a thermal oxidation crosslinking treatment of heating it in an oxygen atmosphere and heating it with an addition of a crosslinking agent such as peroxide after completion of polymerization.

When dry heat treatment is performed for the purpose of increasing the molecular weight through thermal oxidation crosslinking, the temperature is preferably 160 to 260° C., more preferably 170 to 250° C. The oxygen concentration is desirably 5 vol % or more, and more desirably 8 vol % or more. There is no particular upper limit of the oxygen concentration, but the limit is about 50 vol %. The treatment time is preferably 0.5 to 100 hours, more preferably 1 to 50 hours, and still more preferably 2 to 25 hours. The heating treatment apparatus may be a normal hot air dryer or a heating apparatus with a rotary or stirring blade, but it is more preferable to use a heating apparatus with a rotary or stirring blade from the viewpoint of being able to perform treatment efficiently and more uniformly.

It is also possible to perform dry heat treatment for the purpose of inhibiting thermal oxidation crosslinking and removing volatile components. The temperature is preferably 130 to 250° C., more preferably in the range of 160 to 250° C. The oxygen concentration in this instance is desirably less than 5 vol %, and more desirably less than 2 vol %. The treatment time is preferably 0.5 to 50 hours, more preferably 1 to 20 hours, and still more preferably 1 to 10 hours. The heating treatment apparatus may be a normal hot air dryer or a heating apparatus with a rotary or stirring blade, but it is more preferable to use a heating apparatus with a rotary or stirring blade from the viewpoint of being able to perform treatment efficiently and more uniformly.

However, from the viewpoint of exhibiting good toughness, the PPS resin is preferably a substantially linear PPS resin that is not made to have a high molecular weight through a thermal oxidation crosslinking treatment or a semi-crosslinked PPS resin slightly subjected to an oxidation crosslinking treatment. A plurality of PPS resins having different melt viscosities may be mixed and used.

Method of Producing Fiber-Reinforced Thermoplastic Resin Substrate

The fiber-reinforced thermoplastic resin substrate may be obtained by impregnating continuous reinforcing fibers with a PPS resin.

Examples of the method of impregnating continuous reinforcing fibers with a PPS resin include a film method of melting a film-shaped PPS resin and applying a pressure to allow a reinforcing fiber bundle to be impregnated with the PPS resin, a comingle method of mixing a fibrous PPS resin and a reinforcing fiber bundle and then melting the fibrous PPS resin and applying a pressure to allow the reinforcing fiber bundle to be impregnated with the thermoplastic resin, a powder method of dispersing a powdery PPS resin in gaps between fibers in a reinforcing fiber bundle and then melting the powdery PPS resin and applying a pressure to allow the reinforcing fiber bundle to be impregnated with the PPS resin, and a pultrusion method of immersing a reinforcing fiber bundle in a molten PPS resin and applying a pressure to allow the reinforcing fiber bundle to be impregnated with the PPS resin. Among them, the pultrusion method is preferable because various kinds of fiber-reinforced thermoplastic resin substrates having various thicknesses and fiber volume contents can be produced.

The thickness of the fiber-reinforced thermoplastic resin substrate is preferably 0.1 to 10 mm. When the thickness is 0.1 mm or more, the strength of a molded article obtained using the fiber-reinforced thermoplastic resin substrate can improve. The thickness is more preferably 0.2 mm or more. On the other hand, when the thickness is 1.5 mm or less, it is easier to impregnate the reinforcing fibers with the PPS resin. The thickness is more preferably 1 mm or less, still more preferably 0.7 mm or less, and particularly preferably 0.6 mm or less.

The fiber-reinforced thermoplastic resin substrate preferably contains 20 vol % or more and 65 vol % or less of reinforcing fibers in 100 vol % of the entire fiber-reinforced thermoplastic resin substrate. That is, the fiber-reinforced thermoplastic resin substrate preferably has a fiber volume content of 20 to 65 vol %. When the fiber volume content is 20 vol % or more, the strength of a molded article obtained using the fiber-reinforced thermoplastic resin substrate can further improve. The fiber volume content is more preferably 30 vol % or more, still more preferably 40 vol % or more. On the other hand, when the fiber volume content is 65 vol % or less, it is easier to impregnate the reinforcing fibers with the thermoplastic property. The fiber volume content is more preferably 60 vol % or less, still more preferably 55 vol % or less. The fiber volume content can be adjusted to fall within a desired range by adjusting the amounts of the reinforcing fibers and the PPS resin to be added.

The volume content (Vf) of the reinforcing fibers in the fiber-reinforced thermoplastic resin substrate can be calculated from formula (c) by measuring the mass W0 of the fiber-reinforced thermoplastic resin substrate, then heating the fiber-reinforced thermoplastic resin substrate at 500° C. for 30 minutes in the air to burn off the thermoplastic resin component, and measuring the mass W1 of the remaining reinforcing fibers:

$$Vf(\text{vol }\%) = (W1/\rho f) / \{W1/\rho f + (W0 - W1)/\rho r\} \times 100 \tag{c}$$

ρf: Density of reinforcing fiber (g/cm$^3$)
ρr: Density of PPS resin (g/cm$^3$).

The fiber-reinforced thermoplastic resin substrate has good mechanical properties. As a guide, the fiber-reinforced thermoplastic resin substrate preferably has a value of 130 to 200 MPa and more preferably 140 to 180 MPa in a 90° flexural test of a molded piece in accordance with ASTM D790. When the result of the 90° flexural test of the molded piece in accordance with ASTM D790 is 130 MPa or more, the impact resistance and interlayer shear strength of the fiber-reinforced thermoplastic resin substrate tend to improve.

In addition, in the fiber-reinforced thermoplastic resin substrate, a desired impregnation property can be selected according to the use and purpose thereof. Examples thereof include a prepreg having a higher impregnation property, a semi-impregnated semipreg, and a fabric having a low impregnation property. In general, a molding material having a higher impregnation property is preferable because a molded article having good dynamic characteristics can be obtained by molding in a short time.

Examples of the method of applying heat and/or pressure include a press molding method in which a fiber-reinforced thermoplastic resin stacked in any configuration is placed in a die or on a press plate, and then the die or the press plate is closed and pressurized, an autoclave molding method in which a molding material stacked in any configuration is charged into an autoclave and pressurized and heated, a bagging molding method in which a molding material stacked in any configuration is wrapped with a film or the like, and the molding material is heated in an oven while being pressurized at atmospheric pressure with the inside thereof being decompressed, a wrapping tape method in which a tape is wound while tension is applied to a fiber-reinforced thermoplastic resin stacked in any configuration and the resin is heated in an oven, and an internal pressure molding method in which a fiber-reinforced PPS resin stacked in any configuration is placed in a mold and then pressurized using gas, liquid, or the like injected into a core similarly installed in the mold. In particular, a molding method in which pressing is performed using a die is preferably used because a molded article having few voids and good appearance quality is obtained.

As the press molding method, for example, a hot press method in which a fiber-reinforced thermoplastic resin substrate is disposed in advance in a die, pressurization and heating are performed together with clamping, and then the fiber-reinforced thermoplastic resin substrate is cooled by cooling the die while clamping is performed to obtain a molded article, or a stamping molding method in which a fiber-reinforced thermoplastic resin substrate is heated in advance to a temperature equal to or higher than the melting temperature of the thermoplastic resin by a heating device such as a far infrared heater, a heating plate, a high temperature oven, or dielectric heating, and the thermoplastic resin in a molten of soften state is disposed on a die to be the lower surface of the shaping die, and then the die is closed to perform clamping, followed by pressure cooling may be employed. The press molding is not particularly limited and is preferably stamping molding from the viewpoint of accelerating the molding cycle and increasing productivity.

Our fiber-reinforced thermoplastic resin substrates and molded articles can be subjected to integral molding such as insert molding and outsert molding, an adhesive method having good productivity such as correction treatment by heating, heat welding, vibration welding, and ultrasonic welding, or integration using an adhesive, to obtain a composite.

A composite molded article in which the fiber-reinforced thermoplastic resin substrate and a molded article including a thermoplastic resin are at least partially joined is preferable.

The molded article (substrate for molding and molded article) including a thermoplastic resin to be integrated with the fiber-reinforced thermoplastic resin substrate is not particularly limited, and examples thereof include resin materials, resin molded articles, metal materials, metal molded articles, inorganic materials, and inorganic molded articles. Among them, a resin material and a resin molded article are preferable from the viewpoint of adhesive strength with the fiber-reinforced thermoplastic resin.

A matrix resin of the molding material and the molded article integrated with the fiber-reinforced thermoplastic resin substrate may be the same type of resin as the fiber-reinforced thermoplastic resin substrate and the molded article thereof or may be a different type of resin. The same kind of resin is preferable to further increase the adhesive strength. When a different type of resin is used, it is more preferable to provide a resin layer at the interface.

EXAMPLES

Hereinafter, our substrates and molded articles will be described more specifically with reference to Examples, but this disclosure is not limited to the Examples.

In Examples and Comparative Examples, the following materials were used as a PPS resin and a reinforcing fiber.
PPS Resin PPS-1 to PPS-6 were synthesized in the following Reference Examples 1 to 6.

Reference Example 1 (Synthesis of PPS-1)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene, 22.5 g of 1,2,4-trichlorobenzene, and 9.00 kg of NMP were added, the reaction vessel was sealed under nitrogen gas, and the temperature was raised to 238° C. at a rate of 0.6° C./min with stirring at 240 rpm. The mixture was reacted at 238° C. for 95 minutes, and then heated to 270° C. at a rate of 0.8° C./min. The mixture was reacted at 270° C. for 150 minutes, and then cooled to 250° C. at a rate of 1.3° C./min while 1.26 kg of water was press-fitted over 15 minutes. Thereafter, the mixture was cooled to 200° C. at a rate of 1.0° C./min, and then rapidly cooled to near room temperature.

The content was taken out, washed twice with 40.0 kg of NMP, and filtered off. The obtained material was washed and filtered several times with 56.0 kg of ion-exchanged water, and then washed and filtered with 70.0 kg of a 0.05 wt % acetic acid aqueous solution. After the obtained material was washed and filtered with 70.0 kg of ion-exchanged water, the obtained hydrous PPS particles were dried with hot air at 80° C. and dried under reduced pressure at 120° C. The obtained PPS-1 had a weight average molecular weight of 79,000, an ash content of 0.01 wt %, and a carboxyl group content of 10 μmol/g.

Reference Example 2 (Synthesis of PPS-2)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene and 9.00 kg of NMP were added, the reaction vessel was sealed under nitrogen gas, and the temperature was raised to 238° C. at a rate of 0.6° C./min while stirring at 240 rpm. The mixture was reacted at 238° C. for 95 minutes, and then heated to 270° C. at a rate of 0.8° C./min. The mixture was reacted at 270° C. for 150 minutes, and then cooled to 250° C. at a rate of 1.3° C./min while 1.26 kg of water was press-fitted over 15 minutes. Thereafter, the mixture was cooled to 200° C. at a rate of 1.0° C./min, and then rapidly cooled to near room temperature.

The content was taken out, washed twice with 40.0 kg of NMP, and filtered off. The obtained material was washed and filtered several times with 56.0 kg of ion-exchanged water, and then washed and filtered with 70.0 kg of a 0.05 wt % acetic acid aqueous solution. After the obtained material was washed and filtered with 70.0 kg of ion-exchanged water, the obtained hydrous PPS particles were dried with hot air at 80°

C. and dried under reduced pressure at 120° C. The obtained PPS-2 had a weight average molecular weight of 75,500, an ash content of 0.10 wt %, and a carboxyl group content of 18 µmol/g.

Reference Example 3 (Synthesis of PPS-3)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene and 9.00 kg of NMP were added, the reaction vessel was sealed under nitrogen gas, and the temperature was raised to 238° C. at a rate of 0.6° C./min while stirring at 240 rpm. The mixture was reacted at 238° C. for 95 minutes, and then heated to 270° C. at a rate of 0.8° C./min. The mixture was reacted at 270° C. for 200 minutes, and then cooled to 250° C. at a rate of 1.3° C./min while 1.26 kg of water was press-fitted over 15 minutes. Thereafter, the mixture was cooled to 200° C. at a rate of 1.0° C./min, and then rapidly cooled to near room temperature.

The content was taken out, washed twice with 30.0 kg of NMP, and filtered off. The obtained material was washed and filtered several times with 56.0 kg of ion-exchanged water, and then washed and filtered with 70.0 kg of a 0.05 wt % acetic acid aqueous solution. After the obtained material was washed and filtered with 70.0 kg of ion-exchanged water, the obtained hydrous PPS particles were dried with hot air at 80° C. and dried under reduced pressure at 120° C. The obtained PPS-3 had a weight average molecular weight of 78,000, an ash content of 0.01 wt %, and a carboxyl group content of 10 µmol/g.

Reference Example 4 (Synthesis of PPS-4)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene and 90.0 kg of NMP were added, the reaction vessel was sealed under nitrogen gas, and the temperature was raised to 238° C. at a rate of 0.6° C./min while stirring at 240 rpm. The mixture was reacted at 238° C. for 95 minutes, and then heated to 270° C. at a rate of 0.8° C./min. The mixture was reacted at 270° C. for 100 minutes, and then cooled to 250° C. at a rate of 1.3° C./min while 1.26 kg of water was press-fitted over 15 minutes. Thereafter, the mixture was cooled to 200° C. at a rate of 1.0° C./min, and then rapidly cooled to near room temperature.

The content was taken out, washed twice with 30.0 kg of NMP, and filtered off. The obtained material was washed and filtered several times with 56.0 kg of ion-exchanged water, and then washed and filtered with 70.0 kg of a 0.05 wt % acetic acid aqueous solution. After the obtained material was washed and filtered with 70.0 kg of ion-exchanged water, the obtained hydrous PPS particles were dried with hot air at 80° C. and dried under reduced pressure at 120° C. The obtained PPS-4 had a weight average molecular weight of 72,000, an ash content of 0.01 wt %, and a carboxyl group content of 30 µmol/g.

Reference Example 5 (Synthesis of PPS-5)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene and 90.0 kg of NMP were added, the reaction vessel was sealed under nitrogen gas, and the temperature was raised to 238° C. at a rate of 0.6° C./min while stirring at 240 rpm. The mixture was reacted at 238° C. for 95 minutes, and then heated to 270° C. at a rate of 0.8° C./min. The mixture was reacted at 270° C. for 200 minutes, and then cooled to 250° C. at a rate of 1.3° C./min while 1.26 kg of water was press-fitted over 15 minutes. Thereafter, the mixture was cooled to 200° C. at a rate of 1.0° C./min, and then rapidly cooled to near room temperature.

The content was taken out, washed twice with 30.0 kg of NMP, and filtered off. The obtained material was washed with 56.0 kg of ion-exchanged water several times and filtered off to obtain undried PPS particles. The obtained undried PPS resin in an amount of 20 kg and 110 g of calcium acetate monohydrate were added to 200 kg of ion-exchanged water, and the mixture was stirred at 70° C. for 30 minutes and then filtered to perform solid-liquid separation. Ion-exchanged water in an amount of 20 kg was added to the obtained solid content, and the mixture was stirred at 70° C. for 30 minutes and then filtered to recover the solid content. The solid thus obtained was dried at 120° C. under a nitrogen stream.

The obtained PPS-5 had a weight average molecular weight of 65,800, an ash content of 0.30 wt %, and a carboxyl group content of 0 µmol/g.

Reference Example 6 (Synthesis of PPS-6)

To a 70 liter autoclave with a stirrer, 8.27 kg of 47.5% sodium hydrosulfide, 2.96 kg of 96% sodium hydroxide, 11.43 kg of N-methyl-2-pyrrolidone (NMP), 2.58 kg of sodium acetate, and 10.5 kg of ion-exchanged water were charged and gradually heated to 245° C. over about 3 hours while nitrogen was passed at normal pressure, and 14.8 kg of water and 280 g of NMP were distilled off, then the reaction vessel was cooled to 160° C.

Next, 10.2 kg of p-dichlorobenzene and 90.0 kg of NMP were added, the reaction vessel was sealed under nitrogen gas, and the temperature was raised to 238° C. at a rate of 0.6° C./min while stirring at 240 rpm. The mixture was reacted at 238° C. for 95 minutes, and then heated to 270° C. at a rate of 0.8° C./min. The mixture was reacted at 270° C. for 200 minutes, and then cooled to 250° C. at a rate of 1.3° C./min while 1.26 k of water was press-fitted over 15 minutes. Thereafter, the mixture was cooled to 200° C. at a rate of 1.0° C./min, and then rapidly cooled to near room temperature.

The content was taken out, washed twice with 40.0 kg of NMP, and filtered off. The obtained material was washed with 56.0 kg of ion-exchanged water several times and filtered off to obtain undried PPS particles. The obtained undried PPS resin in an amount of 20 kg and 110 g of calcium acetate monohydrate were added to 200 kg of ion-exchanged water, and the mixture was stirred at 70° C. for 30 minutes and then filtered to perform solid-liquid separation. Ion-exchanged water in an amount of 20 kg was added to the obtained solid content, and the mixture was stirred at 70° C. for 30 minutes and then filtered to recover the solid content. The solid thus obtained was dried at 120° C. under a nitrogen stream. The obtained PPS-6 had a weight average molecular weight of 80,000, an ash content of 0.30 wt %, and a carboxyl group content of 0 mol/g.

Reinforcing Fiber

CF-1: carbon fiber bundle (Product name: T700S-12K, manufactured by Toray Industries, Inc.)

Weight Average Molecular Weight of PPS Resin

The weight average molecular weight (Mw) of the PPS resin was determined by gel permeation chromatography (GPC) as polystyrene equivalent. The conditions for the measurement by GPC were as follows:

Apparatus: SSC-7110 manufactured by Senshu Scientific Co., Ltd.

Column name: Shodex UT806M×2, eluent: 1-chloronaphthalene, detector: indication refractive index detector Column temperature: 210° C., pre-thermostat temperature: 250° C.

Temperature of pump thermostat bath: 50° C.

Temperature of detector: 210° C.

Flow rate: 1.0 mL/min

Sample injection amount: 300 μL (slurry form: approximately 0.2 wt %).

Carboxyl Group Content of PPS Resin

The carboxyl group content of the PPS resin was determined by Fourier transform infrared spectrometer (hereinafter, abbreviated as FT-IR).

First, benzoic acid as a standard substance was measured by FT-IR, and the absorption intensity (b1) of a peak at 3066 $cm^{-1}$, which is the absorption of a C—H bond of a benzene ring, and the absorption intensity (c1) of a peak at 1704 $cm^{-1}$, which is the absorption of a carboxyl group, were read to determine the carboxyl group content (U1) per one unit of benzene ring, (U1)=(c1)/[(b1)/5]. Next, the PPS resin was melt-pressed at 320° C. for 1 minute and then rapidly cooled, and the resulting amorphous film was subjected to FT-IR measurement. The absorption intensity (b2) at 3066 $cm^{-1}$ and the absorption intensity (c2) at 1704 $cm^{-1}$ were read to determine the carboxyl group content (U2) per one unit of benzene ring, (U2)=(c2)/[(b2)/4]. The carboxyl group content per 1 g of the PPS resin was calculated from the following formula (d):

Carboxyl group content of PPS resin (μmol/g)=(U2)/(U1)/108.161×1,000,000    (d).

Ash Content

A sample in an amount of 5 g was precisely weighed in a crucible previously air-baked at 550° C., and placed in an electric furnace at 550° C. for 24 hours for ashing. The weight of the ash remaining in the crucible was precisely weighed, and the ratio to the weight of the sample before ashing was calculated as the ash content (wt %).

Measurement of Fiber Volume Content (Vf)

The fiber volume content of the fiber-reinforced thermoplastic resin substrate was determined by measuring the mass W0 of the fiber-reinforced thermoplastic resin substrate, thereafter eluting the PPS resin from the fiber-reinforced thermoplastic resin substrate with 1-chloro-naphthalene, measuring the mass W1 of the remaining reinforcing fibers after drying, and calculating the volume content (Vf) of the fiber-reinforced thermoplastic resin substrate by formula (c):

$$Vf(\text{vol \%})=(W1/\rho f)/\{W1/\rho f+(W0-W1)/\rho r\} \times 100 \quad (c)$$

$\rho f$: Density of reinforcing fiber (g/cm$^3$)

$\rho r$: Density of PPS resin (g/cm$^3$).

Dynamic Characteristics of Molded Piece (900 Flexural Test)

The fiber-reinforced thermoplastic resin substrate (width 50 mm×thickness 0.08 mm, unidirectional substrate) obtained in each of Examples and Comparative Examples was stacked and press-molded in the 0° direction to be 2.0 mm in thickness×100 mm in width×250 mm in length, whereby a fiber-reinforced resin molded article was obtained. The molded article was cut into a rectangular shape of width 15 mm×length 125 mm×thickness 2.0 mm to obtain a molded piece for flexural test measurement. The molded piece was subjected to a flexural test (n=5 for each) in accordance with ASTM D790. It can be said that the larger the numerical value of the 90° flexural strength, the better the dynamic characteristics of the composite material.

Examples 1 to 3, Comparative Examples 1 to 3

A pultrusion method was performed by pulling carbon fiber (T700S-12K) strands (16 strands) in an aqueous slurry of PPS. For blending the aqueous slurry, 11.0 kg of PPS resin pulverized by air milling, 16.0 kg of ion-exchanged water, and 11.3 g of a surfactant (ethoxylated octylphenol) were used. The carbon fibers were coated with PPS resin from the aqueous slurry and then pulled through a die heated to 370° C. to melt or soften the PPS resin. Then, the carbon fibers were completely impregnated with the PPS resin to obtain a fiber-reinforced thermoplastic resin substrate.

The obtained fiber-reinforced thermoplastic resin substrate had a thickness of 0.08 mm and a width of 50 mm, the reinforcing fibers were arranged in one direction, and the volume content was 60%. The obtained fiber-reinforced thermoplastic resin substrate was subjected to the above-described evaluation. The evaluation results are shown in Table 1.

TABLE 1

|     |     | Example 1 | Example 2 | Example 3 | Comparative Example 1 | Comparative Example 2 | Comparative Example 3 |
| --- | --- | --- | --- | --- | --- | --- | --- |
| PPS | Resin type | PPS-1 | PPS-2 | PPS-3 | PPS-4 | PPS-5 | PPS-6 |
|     | Weight average molecular weight Mw | 79000 | 75500 | 78000 | 72000 | 65800 | 80000 |

TABLE 1-continued

|  |  |  | Example 1 | Example 2 | Example 3 | Comparative Example 1 | Comparative Example 2 | Comparative Example 3 |
|---|---|---|---|---|---|---|---|---|
|  | Ash content | wt % | 0.01 | 0.10 | 0.01 | 0.01 | 0.30 | 0.30 |
|  | Carboxyl group content | μmol/g | 10 | 18 | 10 | 30 | 0 | 0 |
| Reinforcing fiber | Reinforcing fiber type |  | CF-1 | CF-1 | CF-1 | CF-1 | CF-1 | CF-1 |
|  | Fiber volume content Vf | % | 60 | 60 | 60 | 60 | 60 | 60 |
| Molded article | Molding temperature | ° C. | 320 | 320 | 320 | 320 | 320 | 320 |
|  | 90° flexural strength of CFRP | MPa | 160 | 153 | 152 | 122 | 63 | 78 |

The results of Examples 1 to 3 and Comparative Examples 1 to 3 will be compared and described.

As shown in Table 1, the fiber-reinforced thermoplastic resin substrates of Examples 1 to 3 have excellent 90° flexural strength.

On the other hand, as shown in Table 1, the fiber-reinforced thermoplastic resin substrate of Comparative Example 1, in which PPS (PPS-4) having a weight average molecular weight outside our range was used, had poor 90° flexural strength of less than 130 MPa. The fiber-reinforced thermoplastic resin substrate of Comparative Example 2, in which PPS (PPS-5) having a weight average molecular weight and an ash content outside our range was used, had particularly poor 90° flexural strength of 63 MPa. The fiber-reinforced thermoplastic resin substrate of Comparative Example 3, in which PPS (PPS-6) having an ash content outside our range was used, had a 90° flexural strength of 78 MPa, which was less than 130 MPa, although it was improved as compared to Comparative Example 2.

INDUSTRIAL APPLICABILITY

Our fiber-reinforced thermoplastic resin substrates and molded articles thereof can be used for various applications such as aircraft parts, automobile parts, electrical and electronic parts, building members, various containers, daily necessities, household goods, and sanitary goods, taking advantage of their good properties. The fiber-reinforced thermoplastic resin substrates and the molded articles thereof are particularly preferably used in applications of aircraft engine peripheral components, aircraft component exterior components, automobile body component vehicle frames, automobile engine peripheral components, automobile underhood components, automobile gear components, automobile interior components, automobile exterior components, intake and exhaust system components, engine cooling water system components, automobile electrical components, and electrical and electronic components, which are required to have impregnation property, thermal aging resistance, and surface appearance. Specifically, the fiber-reinforced thermoplastic resin substrates and molded articles thereof can be preferably used for aircraft engine peripheral components such as fan blades, aircraft related components such as landing gear pods, winglets, spoilers, edges, ladders, elevators, failings, and ribs, automobile body components such as various seats, front bodies, underbodies, various pillars, various members, various frames, various beams, various supports, various rails, and various hinges, automobile engine peripheral components such as engine covers, air intake pipes, timing belt covers, intake manifolds, filler caps, throttle bodies, and cooling fans, automobile underhood components such as cooling fans, top and base of radiator tanks, cylinder head covers, oil pans, brake pipes, tubes for fuel piping, and waste gas system components, automobile gear components such as gears, actuators, bearing retainers, bearing cages, chain guides, chain tensioners, automotive interior component such as shift lever brackets, steering lock brackets, key cylinders, door inner handles, door handle cowls, interior mirror brackets, air conditioner switches, instrumental panels, console boxes, glove boxes, steering wheels, and trims, automotive exterior components such as front fenders, rear fenders, fuel lids, door panels, cylinder head covers, door mirror stays, tail gate panels, license garnishes, roof rails, engine mount brackets, rear garnishes, rear spoilers, trunk lids, rocker molding, moldings, lamp housings, front grilles, mud guards, and side bumpers, intake and exhaust system components such as air intake manifolds, intercooler inlets, turbochargers, exhaust pipe covers, inner bushes, bearing retainers, engine mounts, engine covers, lysonators, and throttle bodies, engine cooling water system components such as chain covers, thermostat housings, outlet pipes, radiator tanks, alternaters, and delivery pipes, automotive electrical components such as connectors, wire harness connectors, motor components, lamp sockets, sensor in-vehicle switches, and combination switches, electrical and electronic components such as power generators, electric motors, transformers, current transformers, voltage regulators, rectifiers, resistors, inverters, relays, power contacts, switchgears, breakers, switches, knife switches, other pole rods, motor cases, television housings, notebook computer housings and internal components, CRT display housings and internal components, printer housings and internal components, housings and internal components for mobile terminal including mobile phones, mobile personal computers, and handheld mobiles, electrical components such as IC or LED-compatible housings, capacitor seat plates, fuse holders, various gears, various cases, and cabinets, and electronic components such as connectors, connectors corresponding to SMT, card connectors, jacks, coils, coil bobbins, sensors, LED lamps, sockets, resistors, relays, relay cases, reflectors, small switches, power supply components, coil bobbins, capacitors, variable capacitor cases, optical pickup chassis, oscillators, various terminal plates, transformers, plugs, printed boards, tuners, speakers, micro-phones, headphones, small motors, magnetic head bases, power modules, Si power modules and SiC power modules, semiconductors, liquid crystals, FDD carriages, FDD chassis, motor brush holders, transformer members, parabolic antennas, and computer related components.

The invention claimed is:

1. A fiber-reinforced thermoplastic resin substrate comprising a plurality of continuous reinforcing fibers and a polyphenylene sulfide resin with which the plurality of continuous reinforcing fibers are impregnated, wherein the polyphenylene sulfide resin has a weight average molecular weight of 75,000 or more and 150,000 or less, and the polyphenylene sulfide resin has an ash content of 0.001 wt % or more and 0.30 wt % or less, and the polyphenylene sulfide resin has a carboxyl group content of 5 µmol/g or more and 20 µmol/g or less.

2. The fiber-reinforced thermoplastic resin substrate according to claim 1, wherein an ash content of the polyphenylene sulfide resin is 0.001 wt % or more and 0.25 wt % or less.

3. The fiber-reinforced thermoplastic resin substrate according to claim 1, having a fiber volume content of 20 to 65 vol %.

4. The fiber-reinforced thermoplastic resin substrate according to claim 1, wherein a molded piece of the fiber-reinforced thermoplastic resin substrate has a 90° flexural strength of 130 to 200 MPa as measured in a 90° flexural test in accordance with ASTM D790.

* * * * *